US012066907B1

(12) United States Patent
McCarthy et al.

(10) Patent No.: US 12,066,907 B1
(45) Date of Patent: Aug. 20, 2024

(54) COLLECTION OF STATE INFORMATION BY NODES IN A CLUSTER TO HANDLE CLUSTER MANAGEMENT AFTER MASTER-NODE FAILOVER

(71) Applicant: NetApp, Inc., San Jose, CA (US)

(72) Inventors: Daniel McCarthy, Erie, CO (US); Lisa Week, Niwot, CO (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/308,922

(22) Filed: Apr. 28, 2023

(51) Int. Cl.
*G06F 11/20* (2006.01)
*G06F 11/14* (2006.01)
*H04L 41/0668* (2022.01)
*H04L 67/104* (2022.01)
*H04L 67/143* (2022.01)
*H04L 67/75* (2022.01)

(52) U.S. Cl.
CPC ........ *G06F 11/203* (2013.01); *G06F 11/1464* (2013.01); *G06F 11/2025* (2013.01); *G06F 11/2046* (2013.01); *H04L 41/0668* (2013.01); *H04L 67/1051* (2013.01); *H04L 67/143* (2013.01); *H04L 67/75* (2022.05)

(58) Field of Classification Search
CPC ............... G06F 11/203; G06F 11/2025; G06F 11/2043; G06F 11/2094; G06F 11/2046; G06F 3/0619; G06F 3/0635; G06F 3/067; G06F 11/2033; G06F 3/0659; G06F 11/2028; G06F 11/2097; G06F 11/1464; G06F 11/2069; G06F 11/3006; G06F 11/1469; G06F 11/2056; G06F 11/2082; G06F 16/275; G06F 16/178; G06F 11/2064; G06F 11/1451; G06F 11/1443; G06F 9/5072; H04L 67/75; H04L 67/143; H04L 67/1034; H04L 41/12; H04L 67/1029; H04L 41/5054; H04L 67/34; H04L 67/1008; H04L 41/0893
See application file for complete search history.

(56) References Cited

U.S. PATENT DOCUMENTS

| 11,593,152 | B1 | 2/2023 | Ashcraft et al. | |
| 2011/0099420 | A1* | 4/2011 | MacDonald McAlister et al. | ...... G06F 11/1464 714/6.32 |
| 2017/0123945 | A1* | 5/2017 | Panasko .............. | G06F 11/2094 |
| 2017/0154091 | A1 | 6/2017 | Vig et al. | |
| 2017/0364423 | A1* | 12/2017 | Peng ..................... | G06F 11/203 |
| 2018/0351855 | A1 | 12/2018 | Sood et al. | |
| 2019/0188190 | A1 | 6/2019 | Kulesza et al. | |
| 2021/0067424 | A1* | 3/2021 | Chaudhary ............. | H04L 67/75 |

* cited by examiner

*Primary Examiner* — Kyung H Shin

(57) ABSTRACT

The disclosed technology enables quicker initialization of a new master node for a cluster when a previous master node fails by tracking node state in the cluster prior to being designated the new master node. In a particular example, a method includes, in a first node, designated as a current master node for the cluster, managing the cluster based on states of the nodes determined by the first node. While the first node is designated the master node, the method includes each of the nodes collecting, and storing locally, the states of the nodes. In response to a failure of the first node, the method includes selecting a second node of the nodes a new master node. Upon being designated the new master node, the method includes the second node managing the cluster of nodes based on the states of the nodes that the second node collected and stored locally.

20 Claims, 7 Drawing Sheets

COLLECTION OF STATE INFORMATION
BY NODES IN A CLUSTER TO HANDLE
CLUSTER MANAGEMENT AFTER
MASTER-NODE FAILOVER

TECHNICAL FIELD

Clustered application environments where a master node manages nodes in a cluster based on states of the nodes.

BACKGROUND

Clustered application environments enable distribution of services across computing nodes in a cluster. A node may be a physical machine or may be a virtualized computing element, such as a virtual machine or container. The number of nodes on which a service is running may be dynamic and provide scalability depending on current needs of the service. In many clustered environments, one of the nodes in the cluster is designated to be a master node. The master node controls the operation of the cluster. For example, the master node may assign application connections or tasks to the various nodes in the cluster.

The master node will typically track the health state of other nodes in the cluster when determining which nodes should receive assignments. If a node is failing or has failed, then the master node will perform a failover procedure for failed node, such as not assigning anything new to the node and reassigning tasks to other nodes in the cluster that are healthy. Should the master node fail, then a new master node will also need to understand the health state of the other nodes to take over for the failed master node. Even if a health-state database was updated by the failed master node to log the health states of the other nodes, the state of the other nodes may have changed in the time it took for the new master node to initialize. Thus, the health-state database cannot be relied upon.

SUMMARY

The technology disclosed herein enables quicker initialization of a new master node for a cluster when a previous master node fails by tracking node state in the cluster prior to being designated the new master node. In a particular example, a method includes, in a first node, designated as a current master node for the cluster, managing the cluster based on states of the nodes determined by the first node. While the first node is designated the master node, the method includes each of the nodes collecting, and storing locally, the states of the nodes. In response to a failure of the first node, the method includes selecting a second node of the nodes a new master node. Upon being designated the new master node, the method includes the second node managing the cluster of nodes based on the states of the nodes that the second node collected and stored locally.

In other examples, an apparatus performs the above-recited methods and computer readable storage media directs a processing system to perform the above-recited methods.

DETAILED DESCRIPTION

When a master node for an application cluster fails, a new master node will be designated to takeover duties from the failed application node. Part of those duties is managing the other nodes in the cluster based on the health-states of the other nodes in the cluster. While a health-state database may have been used by the failed master node to track the health states of the nodes in the cluster, the new master node cannot rely on the potentially outdated information in that database. Nodes could have failed or became healthy in the time between the failure of the master node and the designation of the new master node, and those state changes would not be reflected in the health-state database. As such, the new master node will determine the health-state of other nodes to update the database rather than relying on information already in the database.

The new master node disclosed in the examples below was already determining the health states of other nodes in the cluster prior to being designated the new master node. The health states of the other nodes were stored locally such that the new master node can immediately reference the health states to update the health-state database and manage the other nodes based on the updated database. If the new master node waited to begin gathering the health states, then the new master node's ability to manage the cluster may be delayed by the amount of time it takes to attempt contact with the other nodes. Ideally, the new master node will attempt to contact the other nodes multiple times to avoid false positives (e.g., a missed response from a node may not necessarily indicate that the node has failed), which will delay completion of the new master node's initiation even further. By periodically gathering health-state information about the other nodes in the cluster prior to being designated the new master node, the new master node has already attempted contact with the other nodes multiple times to improve accuracy of the determined health states.

Since the new master node is not designated until after a previous master node has failed, any node in the cluster that could potentially be designated the new master node may also collect health state information from other nodes in the cluster. In the event of a master node failure, the new master node can be selected from any of the nodes having collected and stored the health-states of other nodes in the cluster. Regardless of the node selected to be the new master node, the new master node will have the health states already stored and ready for the new master node to reference for updating the health-state database before managing the cluster.

Figure 1:
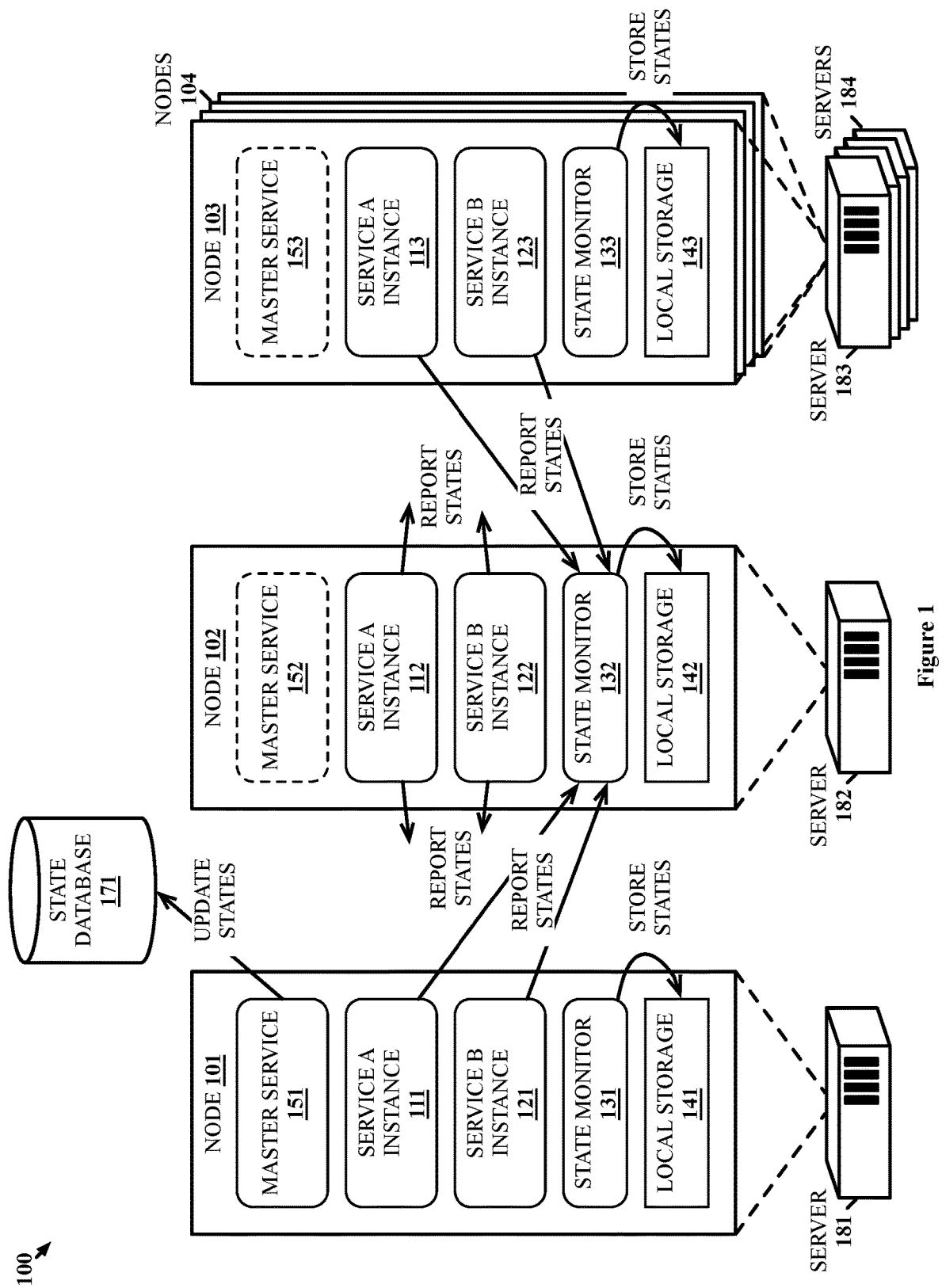
FIG. 1 illustrates an implementation for initializing a new master node using node states determined prior to being designated the new master node.

FIG. 1 illustrates implementation 100 for initializing a new master node using node states determined prior to being designated the new master node. Implementation 100 includes a cluster of nodes 101-104, which are executing on servers 181-184 (although, other types of computing systems may be used), and state database 171. The number of nodes shown in implementation 100 are merely exemplary and other implementations may include different numbers of nodes. While not shown, one or more communication links, networks, and devices may exist to exchange communications between servers 181-184 on behalf of nodes 101-104. In some examples, a server itself may be considered the node (e.g., server 181 may be node 101). In other examples, a node may be a virtual machine, a container, or some other type of process executing on the server.

The node cluster in implementation 100 provides two services, service A and service B, that are implemented as clustered applications via instances executing on each of nodes 101-104. Node 101 executes master service 151, service A instance 111, and service B instance 121, node 102 executes master service 152, service A instance 112, and service B instance 122, node 103 executes master service 153, service A instance 113, and service B instance 123, and nodes 104 similarly execute a master service with instances of service A and service B. In other examples, the nodes may be executing more or fewer services than those shown in this example. Node 101 is designated to be the master node of the cluster and, therefore, master service 151 is actively managing the cluster in this example. In other examples, the functions of master service 151 may be performed by a different process (e.g., may be built into the service instances themselves) when node 101 is designated to be the master node. Since nodes 102-104 are not currently designated the master node, the master services on nodes 102-104 are not actively managing the cluster but are executing in the event one of nodes 102-104 is designated the master node in the future.

Master service 151 may manage the cluster by at least recognizing when a node is not healthy (e.g., failing or failed) and reorganizing the cluster to account for the unhealthy node. For example, master service 151 may reassign the network address of the unhealthy node to a healthy node such that communication traffic directed to the network address will be handled by a healthy node. To that end, master service 151 may communicate with nodes 102-104 to determine the health states of nodes 102-104. In some examples, master service 151 may rely on state monitor 131 to determine the health states rather than duplicating the effort of state monitor 131. In this example, master service 151 updates the health states in state database 171. Master service 151 can then reference state database 171 for the health states when managing the cluster (other processes with read access to state database 171 may also reference state database 171). State database 171 is a database that only a master node updates with health states in this example. In some examples, state database 171 may be a distributed database with nodes located on one or more of servers 181-184 and/or different servers. In some examples, state database 171 may be omitted and master service 151 may rely on health state information stored locally.

Should node 101 fail, one of nodes 102-104 will be designated a new master node. In this example, that new master node will be node 102. In response to being designated the new master node, node 102 begins executing master service 151 (or an already executing instance of master service 151 may become active to perform master node functions). Since node 102 cannot rely on the health state information currently in state database 171, which may have changed since node 101 failed, node 102 updates state database 171 with health-state information stored locally in local storage 142 by state monitor 132, which monitors the health state of other nodes in the cluster. Other nodes in the cluster also execute state monitors, such as state monitor 131 of node 101 and state monitor 133 of node 103, to receive health-state information reported by nodes in the cluster. Each node collects the states reported by other nodes and stores the state information to their respective local storage. Local storage, such as local storage 141-143, may include physical or virtualized Random Access Memory (RAM), a disk or solid-state drive, or some other form of memory present on servers 181-184 for use by nodes 101-104. When node 101 fails, any of nodes 102-104 may be selected to be the new master node and will use the state information stored in local storage thereat to update state database 171 before managing the cluster based on state information in state database 171. While node 102 is selected to be the new master node in this case, the other nodes will continue to collect health-state information so that, should node 102 also fail, one of the other nodes (which may include node 101 after recovering from its previous failure) can update state database 171 and handle cluster management as a subsequent master.

In this example, separate states are stored for the respective service instances executing on each node. It is possible that one service is failing or has failed while the other is operating normally (e.g., there may be a software issue with service A instance 113 on node 103 while service B instance 123 is healthy). In other examples, the state monitors may merely track the states of each respective node as a whole or may determine that, if even on service instance has failed, the whole node has failed.

Figure 2:
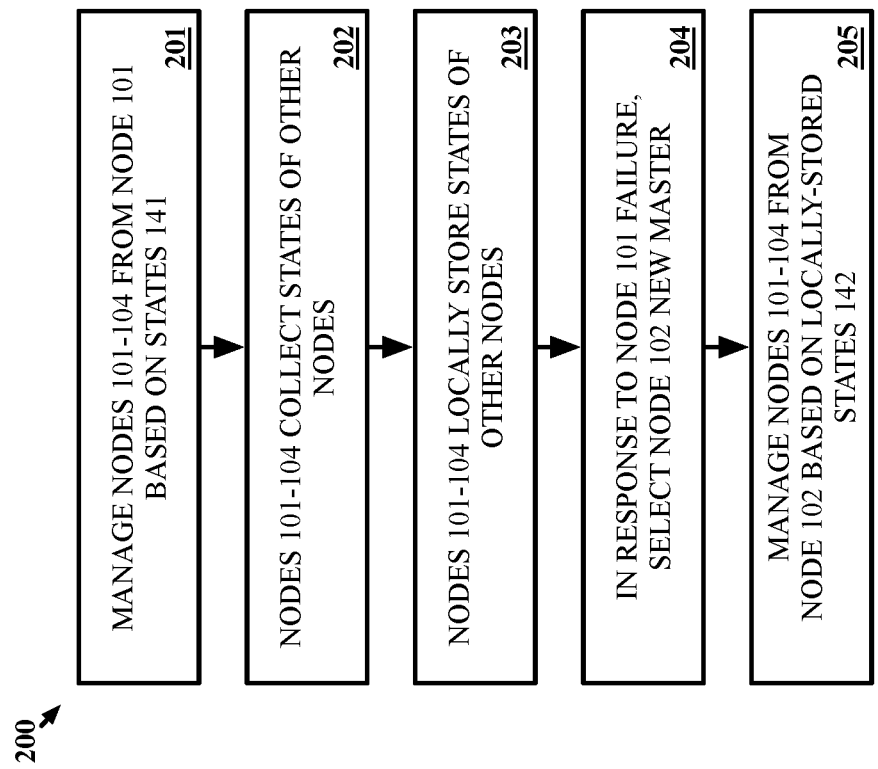
FIG. 2 illustrates an operation to initialize a new master node using node states determined prior to being designated the new master node.

FIG. 2 illustrates operation 200 to initialize a new master node using node states determined prior to being designated the new master node. In operation 200, the current designated master node, node 101, manages the cluster based on states of the nodes determined by the first node (201). In this example, master service 151 is executing to perform master node functions at node 101 but other examples may implement master node functionality in some other manner. Managing the cluster based on the states may include reassigning tasks, aggregates, or other computing responsibilities of a node within the cluster when a node enters a failed or failing state. In one example, the tasks being handled by a failed node may be reassigned by reassigning a network address of a failed node to a node that is healthy. As noted above, the node states may indicate the state of a node as a whole or may indicate the states of particular services or processes executing in the node. Master service 151 may use state information stored in state database 171 to manage the cluster or may use state information collected by state monitor 131 and stored to local storage 141, as described below.

While node 101 is designated the master node, each of nodes 101-104 in the cluster are collecting the states of the nodes 101-104 (202) and storing the states of the nodes to their respective local memories (203). Specifically, each node in this example includes a state monitor, such as state monitors 131-133, that handles the collection of states reported from other nodes. The state monitor's functionality may be included in some other process on a node in other examples. Each node may be configured to periodically report their state to other nodes automatically (e.g., broadcast over a network connecting the nodes) or the state monitors may send out request messages (sometimes referred to as pings) to other nodes to request responses indicating the states. Typically, a failed or failing node will not respond and that lack of a response may be considered a report that the node is in a failed or failing state.

In this example, node 101 also includes state monitor 131 to collect state information from other nodes and store the state information to local storage 141 even though node 101 is already the master node. Master service 151 may use the state information stored in local storage 141 to supplement state information that master service 151 tracks in state database 171. For example, should state database 171 fail, master service 151 would be left without state information for managing the cluster if state database 171 was the only source of such state information. Since state monitor 131 is storing state information in local storage 141, master service 151 can simply access that information from local storage 141 to update state database 171 rather than having to gather state information from scratch. After updating, master service 151 continues to use state database 171 to manage the cluster.

In response to node 101 failing, node 102 is selected to be the new master node (204). The other nodes in the cluster may determine that node 101 has failed due to their respective state monitors determining that node 101 has reached a failed or failing state. Node 102 may be elected to be the new master node by other nodes in the cluster (e.g., the nodes may negotiate with one another to determine node 102 is best suited to become the new master node), a line of succession for new master nodes may indicate that node 102 is next in line to be the master node, another process in communication with the cluster may determine that node 102 should be the new master node, or node 102 may be designated the new master node in some other manner. In this example, since node 102 is now the new master node, master service 152 executing thereon is activated to perform master node functions.

Upon being designated the new master node, node 102 manages the cluster based on the states stored in local storage 142 (205). For example, node 103 may have failed in the time between node 101 failing and node 102 being initialized as the new master node. Without a master node operating to monitor node health during that time, the failure of node 103 would not be recognized by a master node and state database 171 would not be updated accordingly. If master service 152 on node 102 was to simply reference state database 171 during initialization as the new master node, then state database 171 would indicate that node 103 is healthy even though node 103 has failed. However, since state monitor 132 was collecting and updating state information in local storage 142 during the time in which no master node was operational, local storage 142 will indicate that node 103 has failed. As such, master service 152 can reference local storage 142 for the most up-to-date state information and update state database 171 with the up-to-date information. Master service 152 can then manage the cluster based on the information from local storage 142 by virtue of the information now being in state database 171, which is referenced for cluster management. In the above example, master service 152 may reassign tasks for service A instance 113 and service B instance 123 to other instances on other healthy nodes, such as one of nodes 104, or may reassign the network address of node 103 to a healthy node. In examples, where only one service failed on a node (e.g., service B instance 123 of node 103), then master service 152 may handle failover for that specific service while allowing other services on the node to continue as usual.

Figure 3:
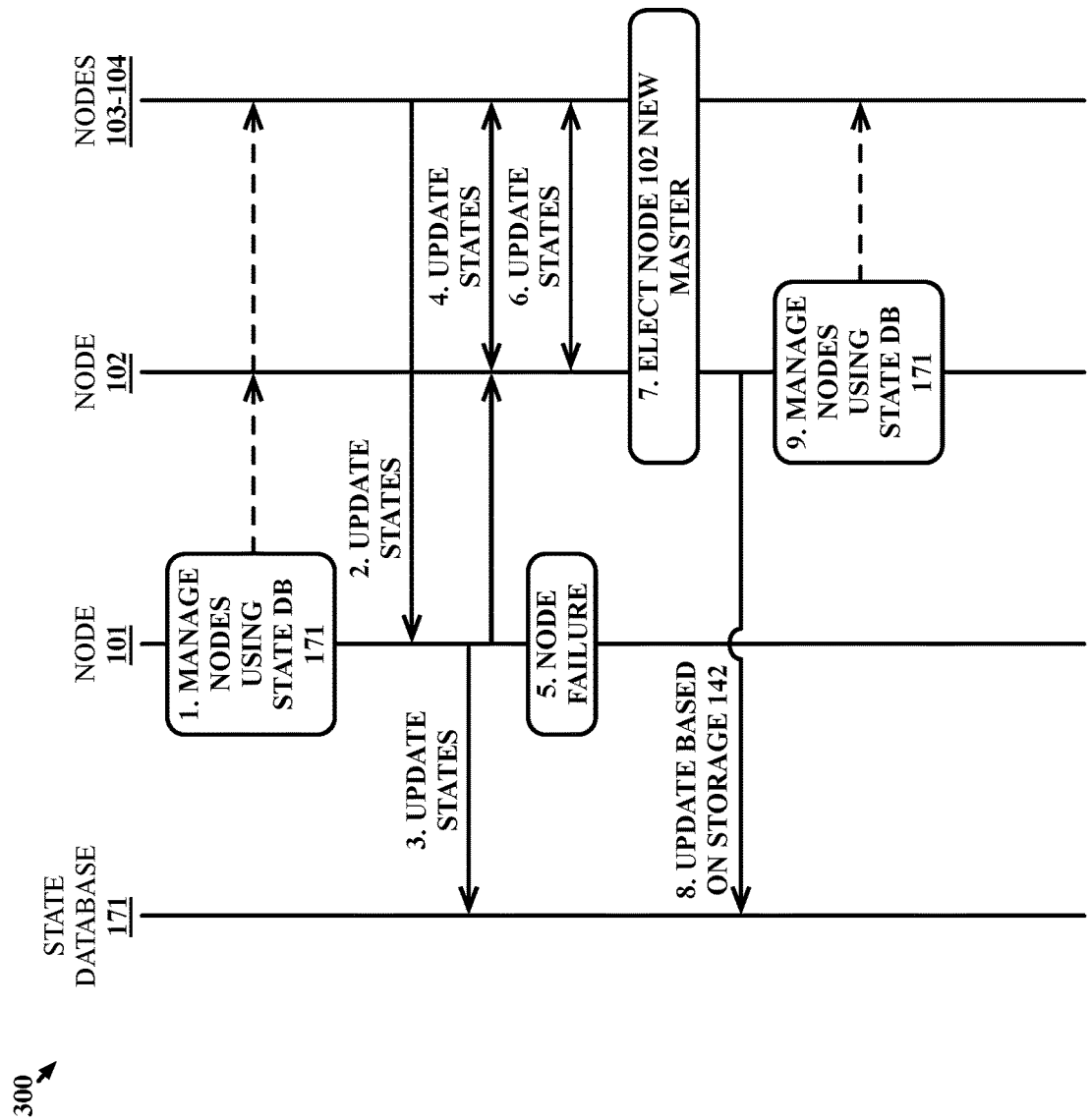
FIG. 3 illustrates an operational scenario for initializing a new master node using node states determined prior to being designated the new master node.

FIG. 3 illustrates operational scenario 300 for initializing a new master node using node states determined prior to being designated the new master node. Operational scenario 300 is an example of how state database 171 may be used in conjunction with the state monitors for respective nodes. In operational scenario 300, master node 101 uses state database 171 at step 1 to determine states of other nodes in the cluster and manages those nodes in accordance with the determined states. The use of state database 171 means node 101 does not have to store state information locally. While still designated the master node, node 101 continues to receive updated state information about the health of other nodes in the cluster at step 2. Should any of the states change from what is currently reflected in state database 171, node 101 updates the states in state database 171 at step 3 to indicate the new states. Only a master node is allowed to update state information in state database 171 in this example so nodes 102-104 cannot update state database 171 directly. However, node 102-104 are executing state monitors that determine at step 4 the health states of other nodes and store state information indicating those states to local storage.

Node 101 fails at step 5 and, before a new master node is initialized, the service monitors of nodes 102-104 continue to update state information in their local storage at step 6. In this example, nodes 102-104 perform an election process among themselves to elect node 102 to be the new master node at step 7. Any state updates that were identified in step 6 will not yet be reflected in state database 171 no master node was operating at the time to update state database 171. Therefore, should node 102 reference state database 171 to manage the cluster upon being elected the new master node, some of the state information in state database 171 may be erroneous, which may lead to undesirable results (e.g., assigning a network address to a failed node that is incapable of handling traffic). Fortunately, node 102 includes state information in local storage 142 that reflects any changes that were identified at step 6 and node 102 is allowed to update state database 171 due to node 102 now being the master node. Thus, node 102 updates state database 171 at step 8 with the state information from local storage 142. In this case, since node 101 is determined to have failed, the update at least indicates that node 101 is in a failing state. Given that up-to-date state information was already in local storage 142 upon node 102 being designated the master node, state database 171 is updated much quicker than had node 102 needed to collect all the state information upon being designated the master node.

Once state database 171 is updated, node 102 manages the cluster as the new master node based on the state information included in state database 171 as normal. Since state database 171 now indicates that at least node 101 has failed, node 102 manages nodes 103-104 accordingly until it is determined that node 101 is again healthy. After the initial update of state database 171, node 102 may then continue to periodically determine the states and update state database 171 with subsequent state changes, which will enable node 102 to manage the cluster based on state information in state database 171. Even though node 102 can use state database 171 to manage the cluster, state monitor 132 may continue to retrieve state information from other nodes in the cluster and update local storage 142 accordingly. Should state database 171 go down, node 102 can update state database 171 with state information as soon as state database 171 comes back online. In other examples, node 102 may be configured to continue managing the cluster using the state information in local storage 142 until state database 171 can be used again. At which point, node 102 may again update state database 171 with state information from local storage 142 identified while state database 171 was down.

Figure 4:
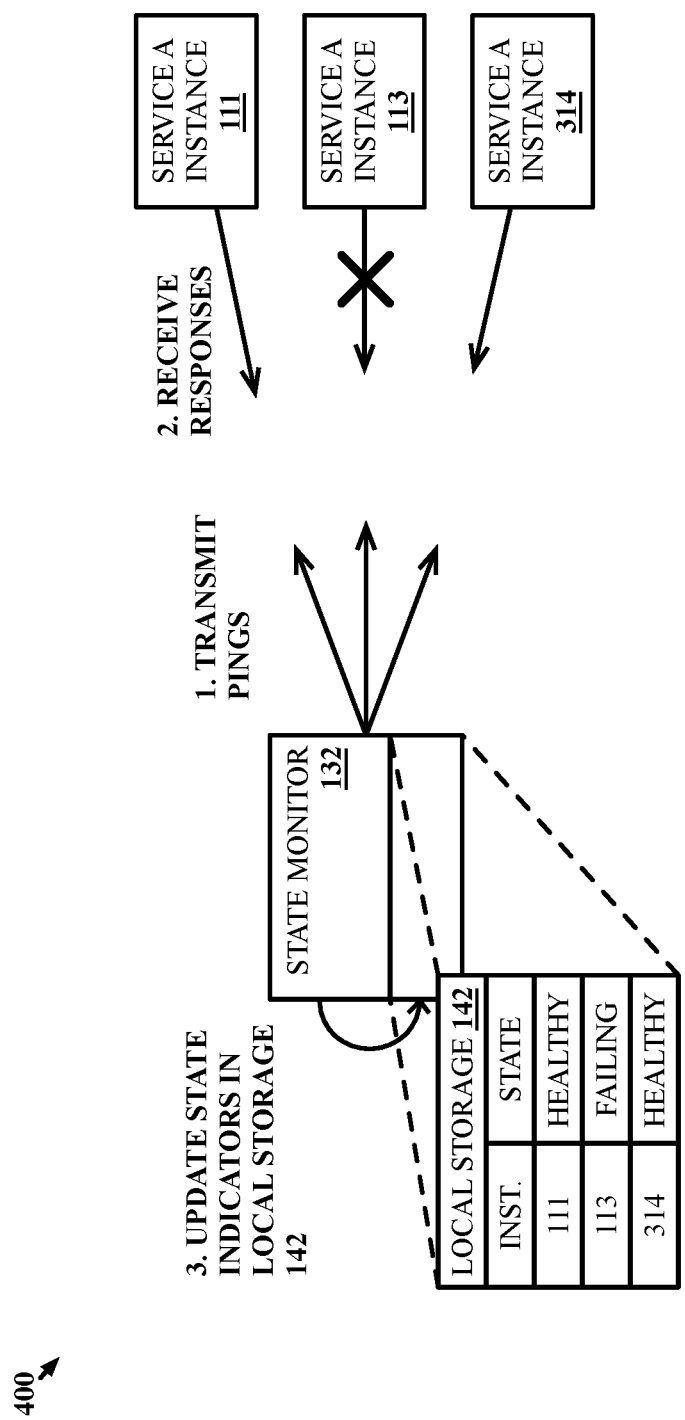
FIG. 4 illustrates an operational scenario for initializing a new master node using node states determined prior to being designated the new master node.

FIG. 4 illustrates operational scenario 400 for initializing a new master node using node states determined prior to being designated the new master node. Operational scenario 400 is an example for how state monitor 132 of node 102 may determine the states of instances of service A at other nodes in the cluster. Operational scenario 400 involves service A instance 111 from node 101, service A instance 113 from node 103, and service A instance 314 from one of nodes 104. Should nodes 104 include more than one node, state monitor 132 may determine the status of service A instances on those nodes in a similar manner. In some examples, state monitor 132 may determine the state of service A instance 112 as well or may assume that, since state monitor 132 is operating, service A instance 112 is also operating. Also, while state monitor 132 is only shown in operational scenario 400 to determine the states of service A instances, state monitor 132 may use a similar method to determine and store the states of service B instances. Likewise, the state monitors of other nodes in the cluster will also perform similarly to determine and locally store states of service instances on other nodes.

In operational scenario 400, state monitor 132 requests state information by transmitting a ping at step 1 to each of service A instance 111, service A instance 113, and service A instance 314. Respective results of those pings are what state monitor 132 uses to determine the state of the particular service instances. In this example, state monitor 132 receives responses at step 2 from service A instance 111 and service A instance 314. However, a response from service A instance 113 is not received. State monitor 132 updates state information in local storage 142 at step 3 to reflect that service A instance 111 and service A instance 314 are healthy and service A instance 113 is in a failing state. Should node 102 be designated the master node prior to anymore updates being made to the states in local storage 142, then node 102 will manage the cluster based on service A instance 111 and service A instance 314 being healthy and service A instance 113 having failed as indicated by local storage 142.

After a period of time (e.g., 1 or 2 seconds), state monitor 132 repeats the process by again sending pings to service A instance 111, service A instance 113, and service A instance 314. Presumably, service A instance 113 will become healthy again at some point and respond to one of the subsequent pings. At which point, state monitor 132 will update local storage 142 to change service A instance 113's state from failing back to healthy. Of course, service A instance 111 or service A instance 314 could subsequently fail and not respond to a future ping. State monitor 132 would responsively change the state of the unresponsive service instance to failing.

While operational scenario 400 indicates that no response to even a single ping would result in the state of a service instance being in the failing state, other examples may use different logic to determine that a service instance is failing. For instance, state monitor 132 may require not receiving responses to a predefined number of pings before a service instance is labelled as being in a failing state. Requiring multiple failed ping responses helps avoid false positives where a ping or ping response gets lost in transmission or a response is otherwise not received by state monitor 132 from a healthy service instance. Similarly, operational scenario 400 indicates that a response alone is enough to determine that a service instance is healthy. However, other examples may allow for information to be sent in the response that state monitor 132 will use to determine whether a service instance is healthy. For example, the response from service A instance 111 may indicate that service A instance 111 is starting, which implies service A instance 111 is not yet ready to perform. As such, if local storage 142 indicated that service A instance 111 was in a failing state, then the mere receipt of the response from service A instance 111 would not be enough to update the state to healthy. Rather, state monitor 132 may wait until a response is received indicating that service A instance 111 is running before updating the state in local storage 142 to healthy.

Figure 5:
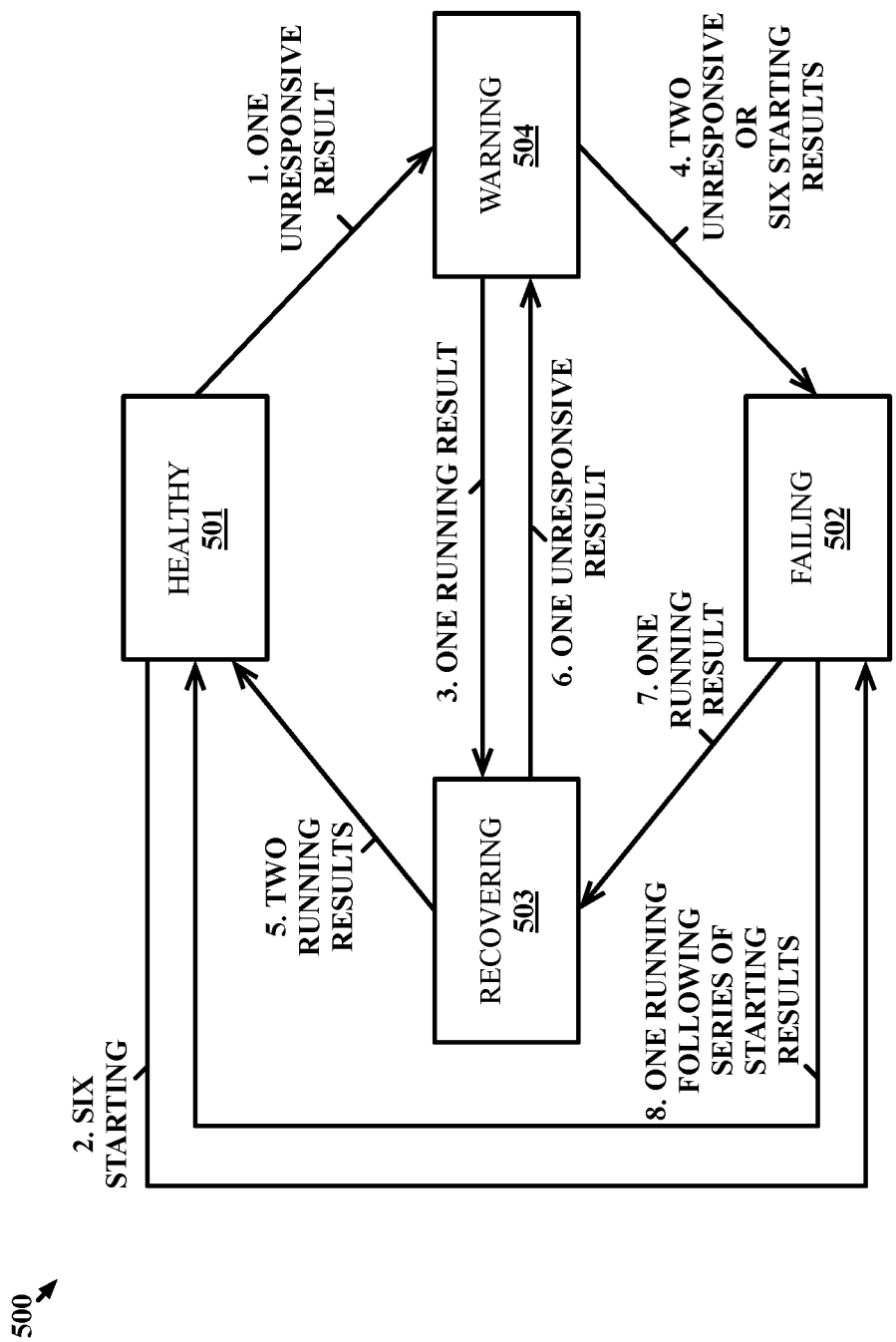
FIG. 5 illustrates a state machine for initializing a new master node using node states determined prior to being designated the new master node.

FIG. 5 illustrates state machine 500 for initializing a new master node using node states determined prior to being designated the new master node. State monitor 132 (and other state monitors in the cluster) may use state machine 500 for each service instance state being determined based on responses to pings being transmitted. For example, state monitor 132 may use one instance of state machine 500 to determine the state of service A instance 111, another instance of state machine 500 to determine the state of service A instance 113, and another instance of state machine 500 to determine the state of service A instance 314 in operational scenario 400. Use of state machine 500 enables state monitor 132 to reduce false positives by including intermediate states for a service instance between healthy and failing and by factoring in multiple ping results when transitioning between states.

State machine 500 includes four possible states for a service instance (or node in examples where the state of a node as a whole is being determined): healthy state 501, failing state 502, recovering state 503, and warning state 504. States equivalent to healthy state 501 and failing state 502 have already been discussed above while recovering state 503 and warning state 504 are intermediate transition states between healthy state 501 and failing state 502. Recovering state 503 is representative of a service instance heading towards healthy state 501 but the results of pings to the service instance have not yet been what is necessary to transition to healthy state 501. Similarly, warning state 504 is representative of the service instance heading towards failing state 502. State monitor 132 may update local storage 142 whenever the state of a service instance transitions as indicated by the output of state machine 500. In other examples, state monitor 132 may only update local storage 142 when the state transitions to a subset of the four states. For instance, recovering state 503 and warning state 504 may be irrelevant for management of the cluster and may not be reflected in local storage 142 (i.e., local storage 142 would only be updated with healthy state 501 or failing state 502).

State machine 500 includes eight possible transitions that may occur based on the results of pings transmitted by state monitor 132 to a service instance. Some of the transitions are based on single results while others require multiple results prior to transitioning to a different state. The specific result numbers are merely exemplary and can be tuned in operation to minimize false positives. The results that state machine 500 uses as input are a response indicating that the service instance is running, a response indicating the service instance is starting, and the service instance being unresponsive (e.g., no response received or a response that does not indicate starting or running as would be expected). The result to a ping is fed into state machine 500 and state machine 500 outputs a state, which may not change from the previous state if conditions for transition between states were not met by the result.

There are two possible transitions when state machine 500 is in healthy state 501. Transition 1 from healthy state 501 to warning state 504 occurs when the service instance is unresponsive to one ping. Since something other than the service instance failing may be the cause of the service instance being unresponsive, state machine 500 does not transition from healthy state 501 directly to failing state 502 in response to a single unresponsive result. Transition 2 from healthy state 501 to failing state 502 when a result is the sixth of six responses in a row that are received from the service instance indicating that the service instance is starting. As such, state machine 500 will track results indicating that the service instance because the results affect whether the state may transition based on future results. In this example, by requiring six responses, state machine 500 is accounting for the fact that the service instance is likely having an issue (i.e., failing) if the service instance is still not running in the time it takes state monitor 132 to send six pings and receive six responses. Ping results that do not cause a transition (e.g., any of 5 consecutive starting responses or a running response) in any state of state machine 500 cause state machine 500's output to remain in the present state.

When state machine 500 is in warning state 504, there are again two possible transitions that will cause state machine 500 to transition from warning state 504 to recovering state 503 or failing state 502. Transition 3 from warning state 504 to recovering state 503 occurs when state monitor 132 receives a response from the service instance indicating that the service instance is running. As noted above, something other than the service instance failing may have caused the unresponsive result in transition 1. Transition 3 provides a path through recovering state 503 for the state of the service instance to return to healthy state 501. However, transition 4 from warning state 504 to failing state 502 occurs when the result being fed into state machine 500 is the second of two unresponsive ping results for the service instance. Alternatively, like transition 2 above, transition 4 occurs when the result fed into state machine 500 is the last of six consecutive unresponsive ping results for the service instance.

When state machine 500 is in recovering state 503, transition 5 from recovering state 503 to healthy state 501 occurs when the result fed into state machine 500 by state monitor 132 is the second of two responses from the service instance indicating that the service instance is running. State machine 500 may require two running results to ensure the service instance is fully operational, especially when returning to healthy state 501 from previously being in failing state 502. Transition 6 from recovering state 503 to warning state 504 occurs when an unresponsive is result fed into state machine 500 because an unresponsive result may be an indication that the service instance is no longer recovering.

When state machine 500 is in failing state 502, transition 7 from failing state 502 to recovering state 503 occurs when the result fed into state machine 500 is a response from the service instance indicating the service instance is running (but not after a series of starting results per transition 8). Transition 8 from failing state 502 to healthy state 501 occurs when the running response received from the service instance follows a series of one or more ping results indicating that the service instance is starting. Effectively, in this example, recognizing the starting sequence prior to a running result allows the state of the service instance to jump straight from failing state 502 to healthy state 501 without first having to transit the recovering state 503. While transition 8 enables a service instance to reach healthy state 501 more quickly, other examples of state machine 500 may remove transition 8 to require the service instance to pass through recovering state 503.

Figure 6:
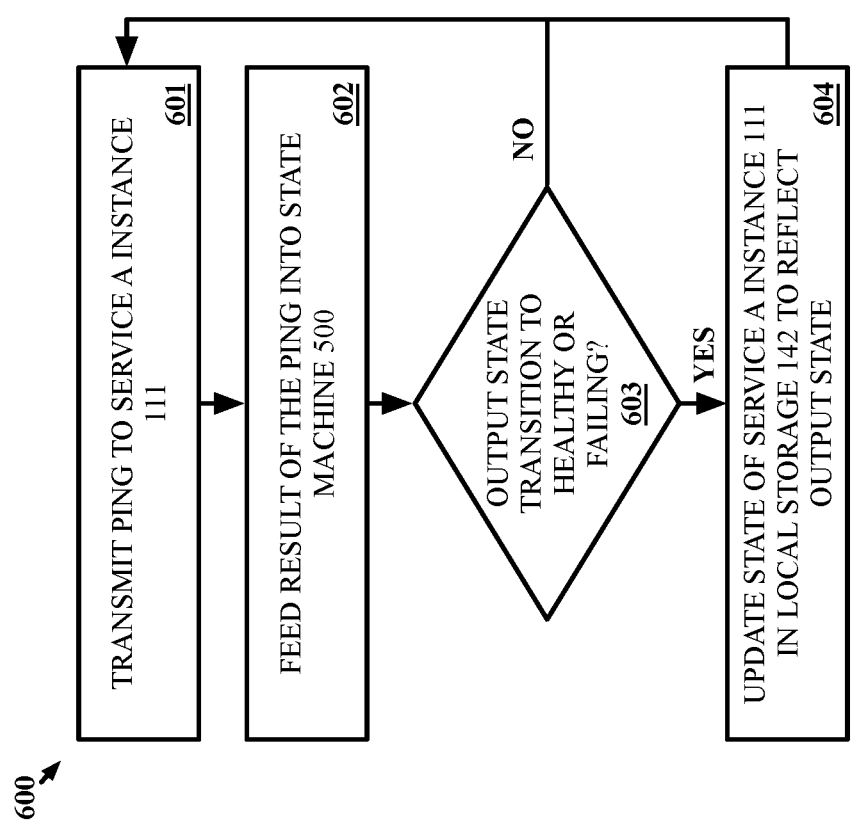
FIG. 6 illustrates an operation to initialize a new master node using node states determined prior to being designated the new master node.

FIG. 6 illustrates operation 600 to initialize a new master node using node states determined prior to being designated the new master node. Operation 600 is described with respect to state monitor 132 determining the state of a single service instance, service A instance 111. However, state monitor 132 would also perform operation 600 for other service instances that are being monitored. Likewise, state monitors on other nodes of the cluster (e.g., state monitor 131 and state monitor 133) would also perform operation 600 during state determination.

In operation 600, state monitor 132 transmits a ping to service A instance 111 (601). State monitor 132 feeds the result of the ping into state machine 500 (602). The result may be a response indicating that service A instance 111 is running, a response indicating the service A instance 112 is starting, or service A instance 111 may be unresponsive. State monitor 132 then determines whether the output state of state machine 500 transitioned to healthy state 501 or failing state 502 (603). In this example, recovering state 503 and warning state 504 are not important to the operation of the cluster so state monitor 132 is only concerned with whether service A instance 111 is in failing state 502 or healthy state 501. Other examples may use recovering state 503 and warning state 504 when managing a cluster and, in those cases, transitions to recovering state 503 and warning state 504 may be identified at step 603.

In this case, if the output of state machine 500 remains in any state from the previous iteration of operation 600 or transitions to recovering state 503 or warning state 504, then state monitor 132 returns to step 601 where another ping is transmitted to service A instance 111. The next ping may be transmitted after waiting a predefined period of time from when the previous ping was transmitted.

If the output of state machine transitions to healthy state 501 or failing state 502 from a state of the previous iteration of operation 600, then state monitor 132 updates the state of service A instance 111 in local storage 142 to reflect the new output state (604). Since the output is either healthy state 501 or failing state 502, state monitor 132 updates local storage 142 to indicate service A instance 111 is healthy or failing in accordance with state machine 500's output. In some situations, the updated state may not change. For instance, service A instance 111 may transition from healthy state 501 to failing state 502 (transition 1) before transitioning to recovering state 503 (transition 3) and then back to healthy state 501 (transition 5). Thus, while the output of state machine 500 transitioned to healthy state 501, local storage 142 was never changed to indicate anything other than service A instance 111 being healthy because the output never reached failing state 502. In those situations, state monitor 132 include another decision block where local storage 142 is not updated if the state remains the same.

State monitor 132 then returns to step 601 where another ping is transmitted to service A instance 111. As noted above, next ping may be transmitted after waiting a predefined period of time from when the previous ping was transmitted. By repeating operation 600 periodically, state monitor 132 is able to continually monitor the state of service A instance 111 so that when node 102 is designated to be the master node, local storage 142 has the most up-to-date state information for service A instance 111 and all other service instances in the cluster being monitored by state monitor 132.

Figure 7:
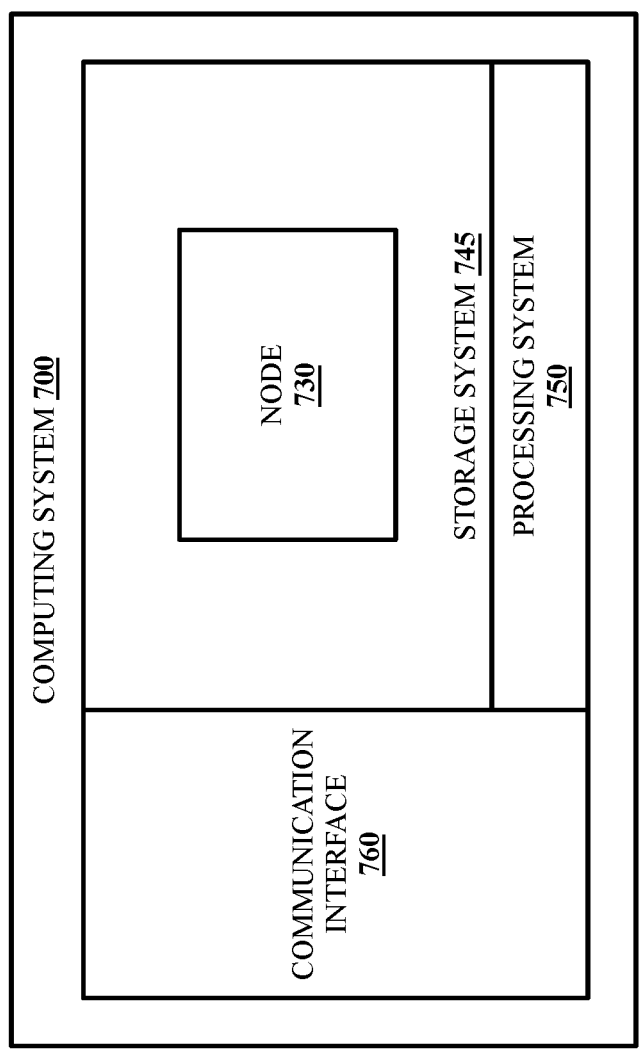
FIG. 7 illustrates a computing system for initializing a new master node using node states determined prior to being designated the new master node.

FIG. 7 illustrates computing system 700 for initializing a new master node using node states determined prior to being designated the new master node. Computing system 700 is representative of any computing system or systems with which the various operational architectures, processes, scenarios, and sequences disclosed herein can be implemented. Computing system 700 is an example architecture for servers 181-184, although other examples may exist. Computing system 700 includes storage system 745, processing system 750, and communication interface 760. Processing system 750 is operatively linked to communication interface 760 and storage system 745. Communication interface 760 may be communicatively linked to storage system 745 in some implementations. Computing system 700 may further include other components such as a battery and enclosure that are not shown for clarity.

Communication interface 760 comprises components that communicate over communication links, such as network cards, ports, radio frequency (RF), processing circuitry and software, or some other communication devices. Communication interface 760 may be configured to communicate over metallic, wireless, or optical links. Communication interface 760 may be configured to use Time Division Multiplex (TDM), Internet Protocol (IP), Ethernet, optical networking, wireless protocols, communication signaling, or some other communication format—including combinations thereof. Communication interface 760 may be configured to communicate with one or more web servers and other computing systems via one or more networks. Communication interface 760 may be configured to communicate with a storage system, such as storage system 105.

Processing system 750 comprises microprocessor and other circuitry that retrieves and executes operating software from storage system 745. Storage system 745 may include volatile and nonvolatile, removable, and non-removable media implemented in any method or technology for storage of information, such as computer readable instructions, data structures, program modules, or other data. Storage system 745 may be implemented as a single storage device but may also be implemented across multiple storage devices or sub-systems. Storage system 745 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no examples would storage media of storage system 745, or any other computer-readable storage medium herein, be considered a transitory form of signal transmission (often referred to as "signals per se"), such as a propagating electrical or electromagnetic signal or carrier wave.

Processing system 750 is typically mounted on a circuit board that may also hold the storage system. The operating software of storage system 745 comprises computer programs, firmware, or some other form of machine-readable program instructions. The operating software of storage system 745 comprises node 730, which is an example of one of nodes 101-104. The operating software on storage system 745 may further include an operating system, utilities, drivers, network interfaces, applications, or some other type of software. When read and executed by processing system 750 the operating software on storage system 745 directs computing system 700 to perform state collection and master-node failover as described herein. Node 730 may execute natively on processing system 705 or the operating software may include virtualization software, such as a hypervisor, to virtualize computing hardware on which node 730 executes.

Node 730 is an example of any of nodes 101-104 and storage system 745 provides the local storage, such as local storage 141-143, to those nodes. In at least one example, node 730 executes on processing system 750. Node 730 directs processing system 750 to manage a cluster of nodes based on states of the nodes when node 730 is designated the master node for the cluster. When node 730 is not the master node for the cluster, node 730 directs processing system 750 to collect, and store locally to storage system 745, the states of the nodes in the cluster. In response to a failure of the master node, node 730 is selected to be a new master node. Upon being designated the new master node, node 730 directs processing system 750 to manage the cluster of nodes based on the states of the nodes that the second node collected and stored locally.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of handling failovers from master nodes in a cluster of nodes to other nodes in the cluster, the method comprising:
    in a first node, designated as a current master node for the cluster, managing the cluster based on states of the nodes referenced from a state database;
    while the first node is designated the master node, each of the nodes collecting, and storing locally, the states of the nodes;
    in response to a failure of the first node, selecting a second node of the nodes to be a new master node;
    upon being designated the new master node, the second node updating the state database with the states of the nodes that the second node collected and stored locally; and
    after updating the state database, the second node managing the cluster based on states of the nodes referenced from the state database.

2. The method of claim 1, wherein the states of the nodes are stored locally as state indicators indicating the respective states of the nodes as being in a healthy state or a failing state, wherein the second node delegates computing functions to those of the nodes that are in the healthy state.

3. The method of claim 1, wherein collecting, and storing locally, the states of the nodes comprises:
    transmitting pings from the nodes to others of the nodes; and
    determining the states of the nodes based on results of the pings.

4. The method of claim 3, wherein determining the states of the nodes based on results of the pings comprises:
    inputting a result of a ping transmitted to a respective node of the nodes to a state machine that outputs a state of the respective node, wherein the state machine includes a healthy state, a recovering state, a warning state, and a failing state; and updating the state of the respective node in a state indicator stored locally, wherein updating the state indicator comprises:
- when output of the state machine indicates the state of the respective node transitioned to the failing state, updating the state indicator to indicate the state of the respective node is in the failing state; and
- when output of the state machine indicates the state of the respective node transitioned to the healthy state, updating the state indicator to indicate the state of the second node is in the healthy state.

5. The method of claim 4, wherein the state of the respective node transitions from the healthy state to:
- the warning state when the result of the ping comprises the respective node being unresponsive, and
- the failing state when the result of the ping comprises a response indicating the respective node is starting and the response is a most recent response of a predefined number of sequential responses indicating that the respective node is starting.

6. The method of claim 4, wherein the state of the respective node transitions from the warning state to:
- the recovering state when the result of the ping comprises a response indicating the respective node is running,
- the failing state when the result of the ping comprises a response indicating the respective node is starting and the response is a most recent response of a predefined number of sequential responses indicating that the respective node is starting, and
- the failing state when the result of the ping comprises the respective node being unresponsive and is a most recent result of a predefined number of sequential unresponsive results while in the warning state.

7. The method of claim 4, wherein the state of the respective node transitions from the recovering state to:
- the warning state when the result of the ping comprises the respective node being unresponsive, and
- the healthy state when the result comprises a response indicating the respective node is running and the response is a most recent response of a predefined number of sequential responses indicating that the respective node is running.

8. The method of claim 4, wherein the state of the respective node transitions from the failing state to:
- the recovering state when the result of the ping comprises a response indicating the respective node is running, and
- the healthy state when the result of the ping comprises a response indicating the respective node is running and the response immediately follows a sequence of responses indicating the respective node is starting.

9. The method of claim 1, wherein the states of the nodes comprise states of a service provided by the nodes.

10. The method of claim 1, wherein the state database only accepts updates from master nodes.

11. One or more computer-readable storage media having program instructions stored thereon for handling failovers from master nodes in a cluster of nodes to other nodes in the cluster, the program instructions, when read and executed by one or more processing systems hosting the cluster of nodes, direct the one or more processing systems to:
- in a first node, designated as a current master node for the cluster, manage the cluster based on states of the nodes referenced from a state database;
- in each of the nodes, while the first node is designated the master node, collect, and store locally, the states of the nodes;
- in response to a failure of the first node, select a second node of the nodes to be a new master node;
- in the second node, upon being designated the new master node, update the state database with the states of the nodes that the second node collected and stored locally; and
- in the second node, after updating the state database, manage the cluster based on states of the nodes referenced from the state database.

12. The one or more computer-readable storage media of claim 11, wherein the states of the nodes are stored locally as state indicators indicating the respective states of the nodes as being in a healthy state or a failing state, wherein the second node delegates computing functions to those of the nodes that are in the healthy state.

13. The one or more computer-readable storage media of claim 11, wherein to collect, and store locally, the states of the nodes, the program instructions direct the one or more processing systems to:
- transmit pings from the nodes to others of the nodes; and
- determine the states of the nodes based on results of the pings.

14. The one or more computer-readable storage media of claim 13, wherein to determine the states of the nodes based on results of the pings, the program instructions direct the one or more processing systems to:
- input a result of a ping transmitted to a respective node of the nodes to a state machine that outputs a state of the respective node, wherein the state machine includes a healthy state, a recovering state, a warning state, and a failing state; and
- update the state of the respective node in a state indicator stored locally, wherein the update to the state indicator comprises:
  - when output of the state machine indicates the state of the respective node transitioned to the failing state, updating the state indicator to indicate the state of the respective node is in the failing state; and
  - when output of the state machine indicates the state of the respective node transitioned to the healthy state, updating the state indicator to indicate the state of the second node is in the healthy state.

15. The one or more computer-readable storage media of claim 14, wherein the state of the respective node transitions from the healthy state to:
- the warning state when the result of the ping comprises the respective node being unresponsive, and
- the failing state when the result of the ping comprises a response indicating the respective node is starting and the response is a most recent response of a predefined number of sequential responses indicating that the respective node is starting.

16. The one or more computer-readable storage media of claim 14, wherein the state of the respective node transitions from the warning state to:
- the recovering state when the result of the ping comprises a response indicating the respective node is running,
- the failing state when the result of the ping comprises a response indicating the respective node is starting and the response is a most recent response of a predefined number of sequential responses indicating that the respective node is starting, and
- the failing state when the result of the ping comprises the respective node being unresponsive and is a most recent result of a predefined number of sequential unresponsive results while in the warning state.

17. The one or more computer-readable storage media of claim 14, wherein the state of the respective node transitions from the recovering state to:
- the warning state when the result of the ping comprises the respective node being unresponsive, and
- the healthy state when the result comprises a response indicating the respective node is running and the response is a most recent response of a predefined number of sequential responses indicating that the respective node is running.

18. The one or more computer-readable storage media of claim 14, wherein the state of the respective node transitions from the failing state to:
- the recovering state when the result of the ping comprises a response indicating the respective node is running, and
- the healthy state when the result of the ping comprises a response indicating the respective node is running and the response immediately follows a sequence of responses indicating the respective node is starting.

19. The one or more computer-readable storage media of claim 11, wherein the states of the nodes comprise states of a service provided by the nodes.

20. A system for handling failovers from master nodes in a cluster of computing nodes to other computing nodes in the cluster, the system comprising:
- a first computing node, designated as a current master node for the cluster, configured to manage the cluster based on states of the computing nodes referenced from a state database;
- the computing nodes each configured to, while the first node is designated the master node, collect, and store locally, the states of the computing nodes;
- in response to a failure of the first computing node, remaining nodes of the computing nodes configured to select a second computing node of the computing nodes to be a new master node;
- the second node configured to, upon being designated the new master node, update the state database with the states of the computing nodes that the second computing node collected and stored locally; and
- the second node configured to, after updating the state database, manage the cluster based on states of the nodes referenced from the state database.

* * * * *